(12) United States Patent
Ghotra et al.

(10) Patent No.: US 10,181,724 B2
(45) Date of Patent: Jan. 15, 2019

(54) SEAMLESS TRANSITIONS BETWEEN CONTROL MODES

(71) Applicant: Eguana Technologies, Calgary, Alberta (CA)

(72) Inventors: Daljit Ghotra, Calgary (CA); Hoang Nguyen, Calgary (CA); Russell J. Morash, Calgary (CA); Keith W. Johnston, Calgary (CA)

(73) Assignee: EGUANA TECHNOLOGIES, Calgary, Alberta (CA)

( * ) Notice: Subject to any disclaimer, the term of this patent is extended or adjusted under 35 U.S.C. 154(b) by 122 days.

(21) Appl. No.: 15/426,925

(22) Filed: Feb. 7, 2017

(65) Prior Publication Data

US 2017/0229866 A1  Aug. 10, 2017

Related U.S. Application Data (60) Provisional application No. 62/293,715, filed on Feb. 10, 2016.

(51) Int. Cl.
*H02J 3/00* (2006.01)
*H02J 9/06* (2006.01)
(Continued)

(52) U.S. Cl.
CPC .............. *H02J 3/005* (2013.01); *H02J 3/383* (2013.01); *H02J 7/0068* (2013.01); *H02J 9/062* (2013.01)

(58) Field of Classification Search
CPC .. H02J 3/005; H02J 9/062; H02J 3/383; H02J 7/0068
See application file for complete search history.

(56) References Cited

U.S. PATENT DOCUMENTS 5,324,990 A  6/1994  Cunningham
5,834,132 A  11/1998  Hasegawa
(Continued)

FOREIGN PATENT DOCUMENTS

EP  2685582 A1  1/2014
JP  05174964 A  7/1993
(Continued)

OTHER PUBLICATIONS

European Search Report for European Patent Application No. 17155738.2, dated May 19, 2017; 9 pages.
(Continued)

*Primary Examiner* — Robert Deberadinis
(74) *Attorney, Agent, or Firm* — Schwabe Williamson & Wyatt, PC (57) ABSTRACT

A power conversion system (PCS) seamlessly transitions between different control modes. A digital signal processor (DSP) may operate in a first control mode where a first setpoint for operating the inverter is associated with a first one of the AC power, DC voltage, or DC current. The DSP then seamlessly transitions into a second control mode where a second setpoint used for operating the inverter is associated with second one of the AC power, DC voltage, and DC current. The DSP also may seamlessly transition from the first or second control mode to an off-grid mode by operating the inverter based on an AC voltage setpoint generated by the inverter. The seamless control mode transitions allow the PCS to more effectively control the inverter output using feedback parameters other than just the output power.

17 Claims, 7 Drawing Sheets

(51) Int. Cl.
*H02J 3/38* (2006.01)
*H02J 7/00* (2006.01)

(56) References Cited

U.S. PATENT DOCUMENTS

| | | |
|---|---|---|
| 2001/0004170 A1 | 6/2001 | Schienbein |
| 2004/0021445 A1 | 2/2004 | Harris |
| 2005/0088868 A1 | 4/2005 | Ryan |
| 2011/0304299 A1 | 12/2011 | Yang |
| 2012/0146587 A1 | 6/2012 | Srinivasan |
| 2014/0217826 A1 | 8/2014 | Oguchi |
| 2014/0239724 A1 | 8/2014 | Ishikawa |
| 2015/0022004 A1 | 1/2015 | Okuda |

FOREIGN PATENT DOCUMENTS

| | | |
|---|---|---|
| KR | 201500090371 A | 8/2015 |
| WO | 2012/049910 A1 | 4/2012 |
| WO | 2013015192 A1 | 1/2013 |
| WO | 2014/080599 A1 | 5/2014 |
| WO | 2014/112925 A1 | 7/2014 |
| WO | 2014/147294 A1 | 9/2014 |
| WO | 2015/128359 A1 | 9/2015 |

OTHER PUBLICATIONS

European Search Report for European Patent Application No. 17155724.2, dated Jun. 14, 2017; 9 pages.

FIG. 1

DISTRIBUTED ENERGY RESOURCE (DER) SYSTEM

TYPICAL DISCHARGE CURVE FOR A LITHIUM-ION BATTERY

TIME RESPONSE OF VOLTAGE AND CURRENT WAVEFORMS AS A CONTROL MODE TRANSITION OCCURS BETWEEN AC POWER AND DC CURRENT

FIG. 7

SEAMLESS TRANSITIONS BETWEEN CONTROL MODES

The present application claims priority to U.S. Provisional Patent Application Ser. No. 62/293,715 filed on Feb. 10, 2016, entitled: POWER CONTROL SYSTEMS which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to controlling transitions between inverter control modes.

BACKGROUND

A power conversion system (PCS) within a battery storage system inverts DC power output from batteries into AC power, which can then be exported to the grid. The PCS uses a digital signal processor (DSP) to manage the switching controls within an inverter power circuit. Example DSP circuits that operate as step wave power converters are described in U.S. Pat. Nos. 6,608,404 and 7,808,125 which are herein incorporated by reference in their entireties. These DSP circuits may use a feedback process where a measured power level is compared with a parameter setpoint. The setpoint may be manually set by a user or set through an energy management system (EMS).

A fundamental control parameter is the AC output power from the PCS. The PCS may perform a cycle-by-cycle calculation of the output voltage and current magnitudes of the battery output power. The calculated PCS power is then compared with the setpoint and the error is used to adjust power circuit switching. Output power from the PCS is often used for control feedback since the output power is directly tied to the functionality of the battery system (i.e., storing and exporting energy).

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

A power conversion system (PCS) seamlessly transitions between different control modes. A digital signal processor (DSP) may operate in a first control mode where a first setpoint for operating the inverter is associated with a first of the AC power, DC voltage, or DC current. The DSP then seamlessly transitions into a second control mode where a second setpoint used for operating the inverter is associated with a second of the AC power, DC voltage, and DC current. The DSP also may seamlessly transition from the first or second control mode to an off-grid mode by operating the inverter based on an AC voltage setpoint generated by the inverter. The seamless control mode transitions allow the PCS to more effectively control the inverter output using feedback parameters other than just the output power.

Figure 1:
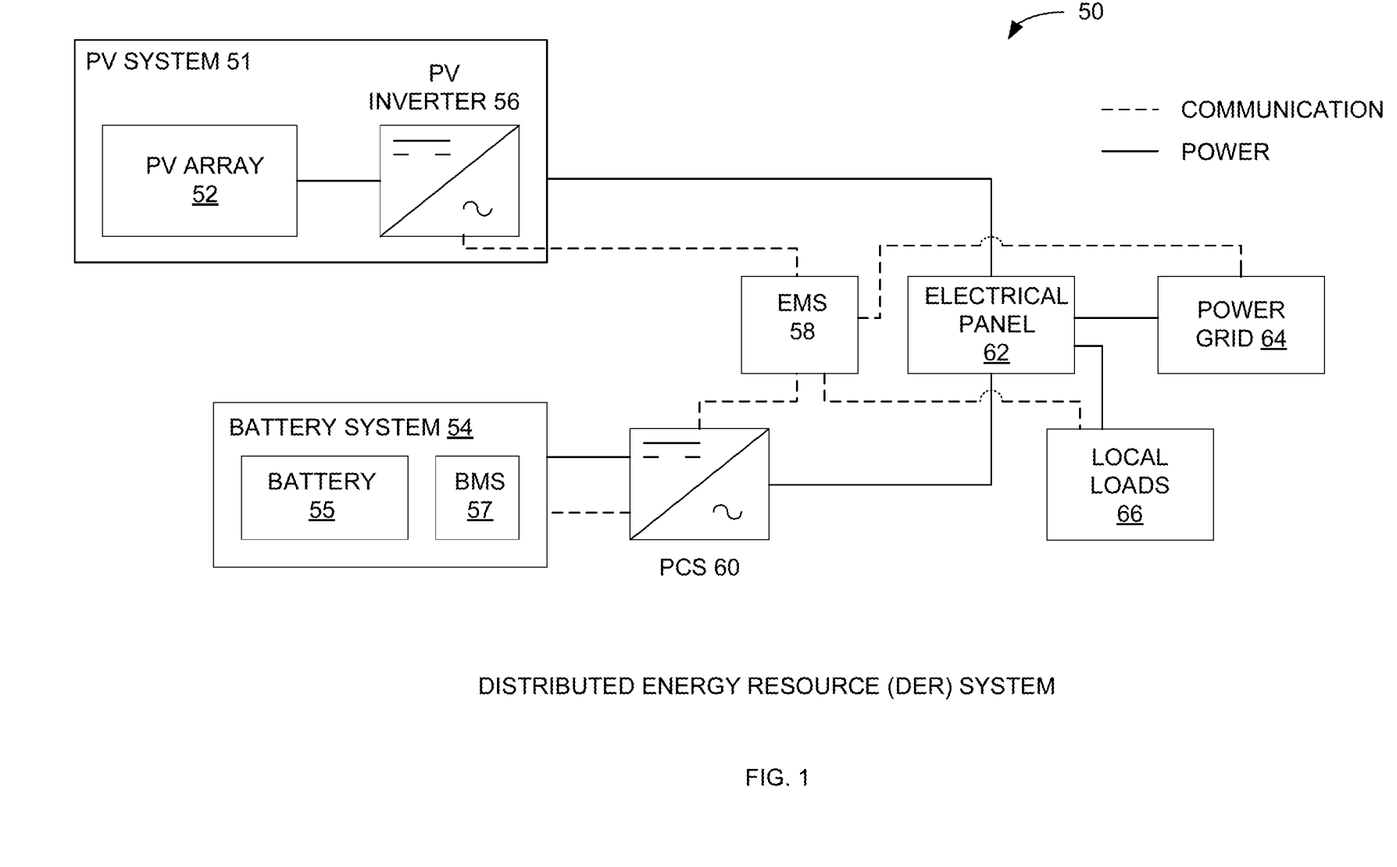
FIG. 1 shows an example distributed energy resource (DER) system that may use a seamless control transition system.

FIG. 1 shows a distributed energy resource (DER) system 50. In one example, a photovoltaic array 52 connects through a photovoltaic inverter 56 to an electrical panel 62. A battery system 54 may connect to electrical panel 62 through a power conversion system (PCS) 60. Electrical panel 62 may supply power from photovoltaic (PV) array 52 and battery system 54 to different local loads 66 and/or to a power grid 64.

PV array 52 may be any type of device capable of converting solar energy into electrical energy. In one example, PV inverter may convert direct current (DC) power from PV array 52 into alternating current (AC) power for different local AC loads 66 and/or other remote AC devices connected to power grid 64. PCS 60 also may charge battery system 54 using power supplied by PV array 52 or power grid 64 and also may convert stored DC energy in battery system 54 into AC power for powering local loads 66 and exporting power to the power grid 64.

DER system 50 may use an energy management system (EMS) 58 to coordinate power flow between PV array 52, battery system 54, local loads 66, and power grid 64. EMS 58 may communicate with other energy sources throughout the power system, manage power flow within DER 50, and respond to varying grid conditions or dispatch commands.

Battery system 54 typically relies on three main components that interact with each other. These include a battery management system (BMS) 57, PCS 60, and EMS 58. BMS 57 monitors the state and condition of battery 55 and provides protection against unsafe operating states (e.g., high battery cell temperatures). BMS 57 also provides handshaking and information transfer with other power components. Battery 55 can be a single battery or multiple batteries combined within battery system 54.

PCS 60 is a linking element that enables power transfer between battery 55 and loads 66 connected to electrical panel 62. PCS 60 may contain an inverter that converts DC power from battery 55 into AC power which may be used to power local loads 66 or to export to the power grid. PCS 60 may be bidirectional to convert AC power from power grid 64 and/or PV array 52 into DC power for charging battery 55.

EMS 58 coordinates power flow between power grid 64, battery 55, local loads 66, and PV array 52. EMS 58 may implement algorithms to manage battery charging and discharging based upon electricity price structures such as time-of-use metering or demand charging.

PCS 60 may act as a bridge between BMS 57 and EMS 58. PCS 60 converts power demand signals from EMS 58 into real power flow between the power converter and battery 55. As a result, PCS 60 is uniquely equipped to collect detailed information about battery system 54 in real-time. PCS 60 also has access to physical and operational parameters that would not otherwise be conveyed to EMS 58. For example, PCS 60 may convey battery temperature, instantaneous power, and state of charge to EMS 58.

PCS 60 includes a digital signal processor (DSP) that manages the switching controls within an inverter power circuit such as the step wave power converter described in U.S. Pat. Nos. 6,608,404 and 7,808,125 which are herein incorporated by reference in their entireties. These controls are based on a feedback process involving a parameter setpoint, which can be set manually by a user or set through EMS 58.

Other example inverter and bridge circuits used in PV inverter 56 and PCS 60 are described in U.S. patent applications such as U.S. Pat. No. 6,198,178; U.S. Pat. No. 8,031,495; U.S. Pat. No. 6,628,011; U.S. Pat. No. 6,765,315; U.S. Pat. No. 6,738,692; and U.S. Pat. No. 7,087,332 which are all also herein incorporated by reference in their entireties.

Battery 55 in battery system 54 may store energy output from PV array 52. DSP 74 operating within PCS 60 may measure current and/or voltage data from both battery system 54 and PV system 51 and perform functions in PCS 60, such as power measurements, control, and inverter system switching.

Seamless Transitions Between Control Modes

Figure 2:
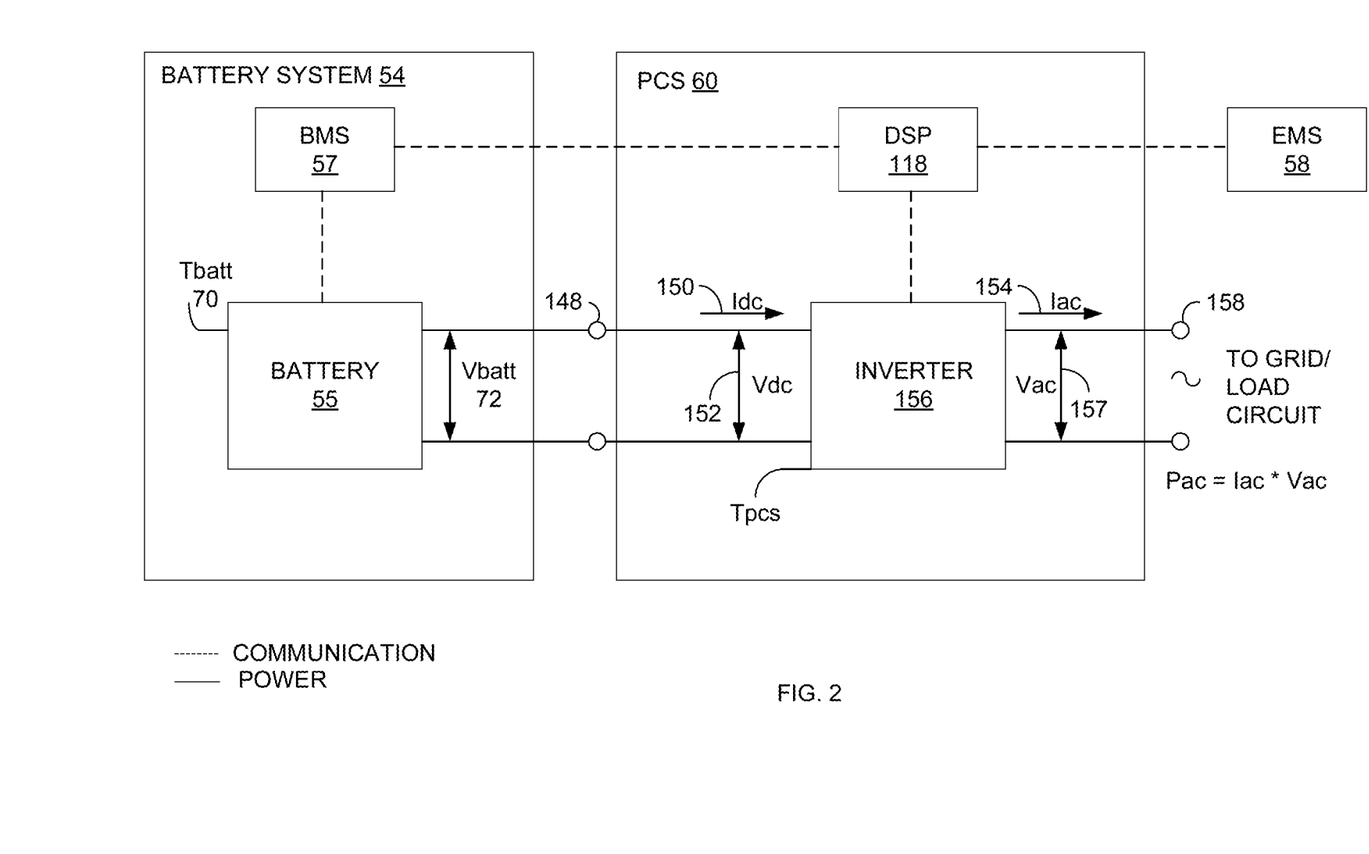
FIG. 2 is a circuit diagram showing a power conversion system (PCS) that performs seamless control mode transitions.

FIG. 2 shows an example power conversion system (PCS) 60 that performs seamless control mode transitions. As mentioned above, PCS 60 includes an inverter 156 controlled by DSP 118. DSP 118 may communicate with BMS 57 in battery system 54 exchanging battery parameters that include a battery temperature 70 (Tbatt), battery voltage 72 (Vbatt), and many others. Inverter 156 can convert DC power from battery 55 into AC power for feeding power grid 64 or a microgrid that supplies AC power to local loads 66. Inverter 156 can also convert AC power from power grid 64 into DC power for charging battery 55.

DSP 118 measures DC current 150 (Idc) and DC voltage 152 (Vdc) at DC terminals 148 of inverter 156 and measures AC current 154 (Iac) and AC voltage 157 (Vac) at AC terminals 160 of PCS 60. The AC output power (Pac) at AC terminals 158 is the product of the RMS AC current 154 and RMS AC voltage 156 (Pac=Iac*Vac). DSP 118 also may measure the temperature in PCS 60 (Tpcs) and other parameters.

PCS 60 uses the measured signals Idc, Vdc, Pac, and Vac to operate inverter 156 and to maintain the condition of battery 55. Signals Idc, Vdc, Pac, and Vac are monitored continuously and the magnitudes of the signals are determined on a cycle-by-cycle basis.

In one example, a battery warranty may be voided when the battery is operated above certain power levels during certain battery temperature ranges Tbatt. PCS 60 may transition to a control mode that uses Idc 150 as a setpoint to ensure power from battery 55 remain below specified current levels during abnormal operating conditions (e.g., battery cell temperature below 0° C.).

PCS 60 may control inverter 156 in different operating control modes based on setpoints associated with any one of Idc, Vdc, Pac, and Vac. Rapidly and seamlessly transitioning between these different control modes using these different setpoints may minimize power losses and prevent power flow interruptions during control mode transitions.

Figure 3:
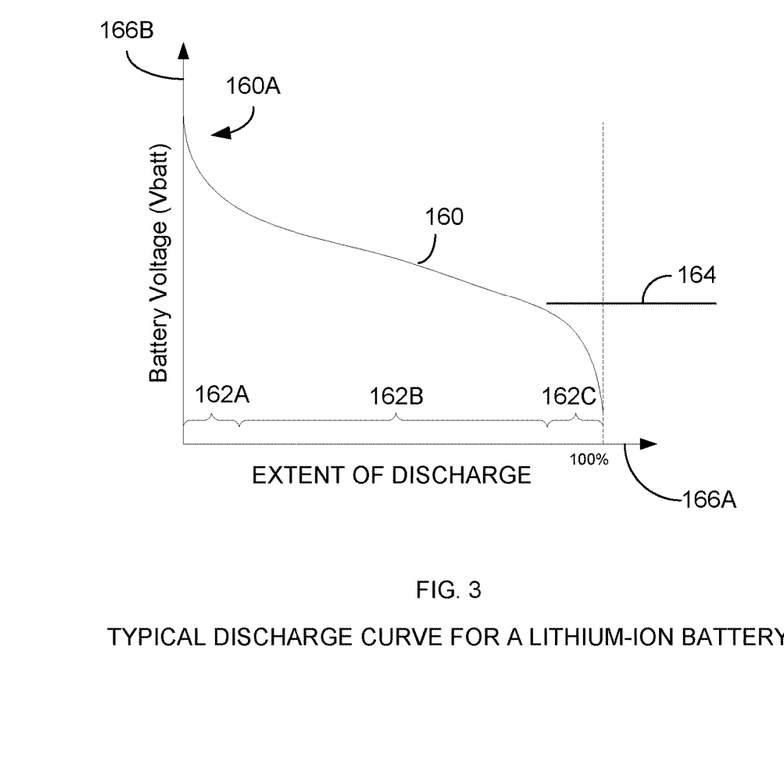
FIG. 3 shows the relationship between terminal voltage and depth of discharge for a typical lithium-ion battery.

FIG. 3 shows a typical relationship between terminal voltage and the extent of discharge for a lithium-ion battery. The horizontal x-axis 166A represents a percentage of discharge in the battery and the vertical y-axis 166B represents DC voltage output from the battery. The battery may have a highest battery voltage 160A in a fully charged state. Voltage 160 may decline rapidly during a first discharge state 162A, and then decline substantially linearly during a middle discharge state 162B. Voltage 160 again discharges rapidly during a third discharge state 162C. Thus, DC voltage 160 may identify the state of charge (SOC) in the battery at a specific temperature.

Referring back to FIG. 2, PCS 60 may transition into a DC voltage control mode where Vdc 152 is used as a setpoint and feedback for determining the SOC in battery 55. During the DC voltage control mode, DSP 118 may direct inverter 156 to either charge or discharge battery 55 based on DC voltage 152.

The circuitry in FIG. 2 also may operate in an off-grid mode where PCS 60 operates inverter 156 based on a Vac setpoint. In the off-grid mode, inverter 156 may operate independently of power grid 64 in FIG. 1. For example, a power outage may disrupt normal AC power service on AC grid 64. In this situation, PCS 60 may create a microgrid where inverter 156 generates the AC voltage and powers certain local loads 66.

During the off-grid mode, DSP 118 may seamlessly transition between any existing on-grid control mode to the off-grid control based on Vac control. During typical AC power grid outages, a DER system 50 may shut down for several seconds and then reboot to create a local microgrid. During this time the local loads 66 are disconnected from both the DER system 50 and the AC grid 64, so the power flow to them is interrupted. By contrast, seamlessly transitioning to the off-grid mode allows DER system 50 to operate as an uninterruptable power supply (UPS) maintaining power to certain local loads 66 during AC grid outages.

Figure 4:
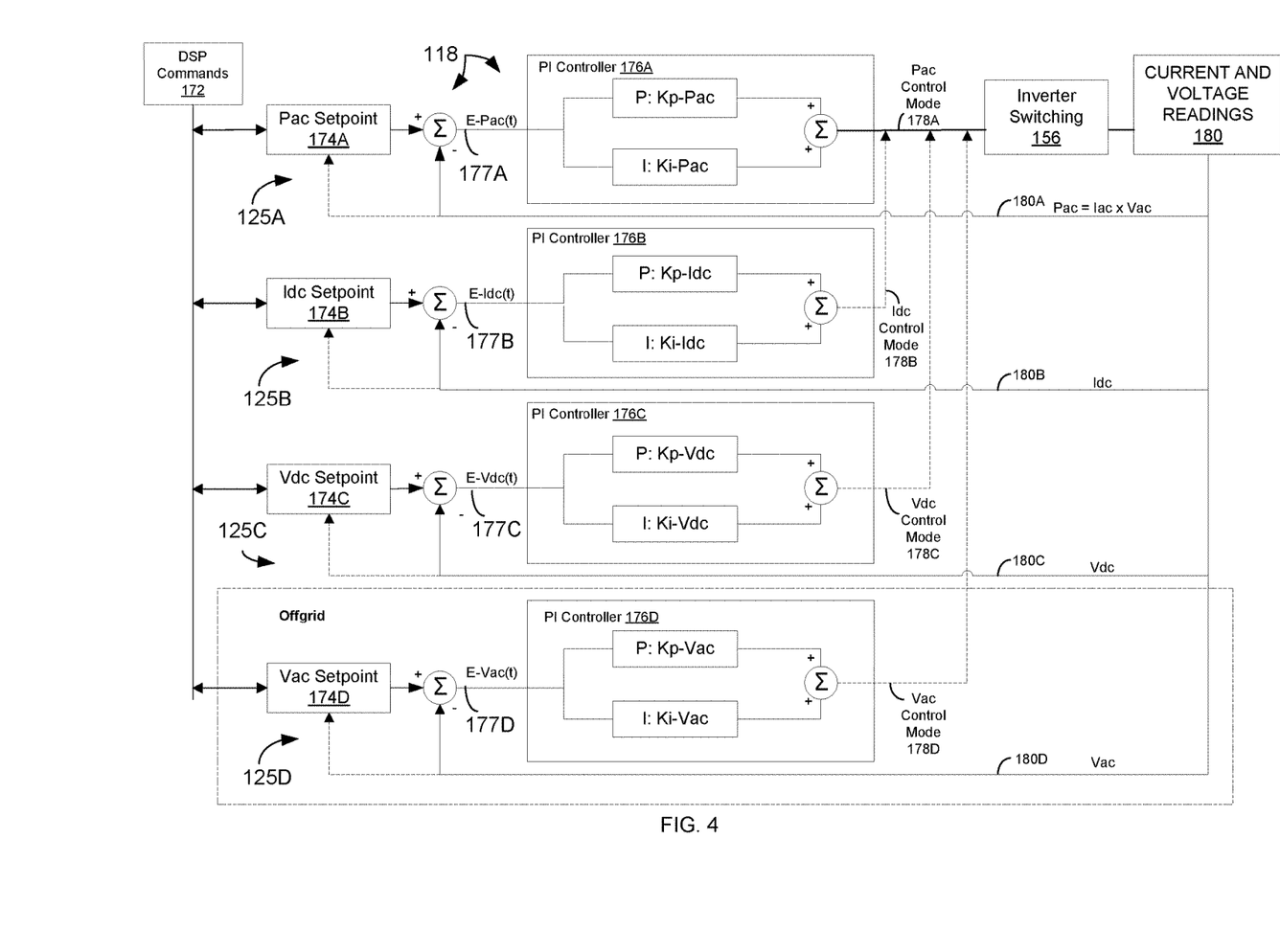
FIG. 4 shows example seamless control mode transition control loops.

FIG. 4 shows the seamless transition system in more detail. In one example, the operations described below are performed in DSP 118 operating within PCS 60. However, in other examples, a separate DSP or other circuitry may perform the seamless control transitions.

Four different control loops 125 may operate in parallel within DSP 118. A first Pac control loop 125A may include a proportional integration (PI) controller 176A. PI controller 176A may include a proportional coefficient Kp-Pac and an integration coefficient Ki-Pac used for generating PI control terms that are summed to produce a Pac control signal 178A that controls inverter switching 156. The DSP 118 reads current and voltage values from sensors in operation 180 and determines AC power value. Pac control loop 125A may use the AC power as feedback 180A for comparing with a Pac setpoint 174A stored in DSP memory. DSP 118 uses an error value E-Pac(t) 177A between Pac setpoint 174A and Pac feedback 180A as input to the PI controller 176A, which uses proportional coefficient Kp-Pac and integration coefficient Ki-Pac.

An Idc control loop 125B may include a proportional integration (PI) controller 176B. PI controller 176B may include a proportional coefficient Kp-Idc and an integration coefficient Ki-Idc used for generating an Idc control signal 178B that may be used to control inverter switching 156. Idc control loop 125B may use measured Idc as feedback 180B for comparing with an Idc setpoint 174B stored in DSP memory. DSP 118 uses an error value E-Idc(t) 177B between Idc setpoint 174B and Idc feedback 180B as input to the PI controller 176B, which uses proportional coefficient Kp-Idc and integration coefficient Ki-Idc.

A Vdc control loop 125C may include a proportional integration (PI) controller 176C. PI controller 176C may include a proportional coefficient Kp-Vdc and an integration coefficient Ki-Vdc used for generating a Vdc control signal 178C that may be used to control inverter switching 156. Vdc control loop 125C may use the measured Vdc as feedback 180C for comparing with a Vdc setpoint 174C stored in DSP memory. DSP 118 uses the error E-Vdc(t) 177C between Vdc setpoint 174C and Vdc feedback 180C as input to the PI controller 176C, which uses proportional coefficient Kp-Vdc and integration coefficient Ki-Vdc.

A Vac control loop 125D may include a proportional integration (PI) controller 176D. PI controller 176D may include a proportional coefficient Kp-Vac and an integration coefficient Ki-Vac used for generating a Vac control signal 178D that may be used to control inverter switching 156. Vac control loop 125D may use the measured Vac as feedback 180D for comparing with a Vac setpoint 174D stored in DSP memory. DSP 118 uses the error E-Vac(t) 177D between Vac setpoint 174D and Vac feedback 180D as input to the PI controller 176D, which uses proportional coefficient Kp-Vac and integration coefficient Ki-Vac.

Outputs 178 from PI controllers 176B-D are shown as dashed lines connected to inverter 156 to represent standby operating modes that do not actually drive the inverter switching operation 156. One of the other outputs 178B-D only become inputs to inverter switching 156 when another control mode is selected, which would be represented by one of the other outputs 178B-D becoming solid lines. Only one of the outputs 178 from the PI controllers 176 can be used as an input to inverter switching 156 at any one time.

Feedback signals 180A-D may provide constant feedback for associated control loops 125A-D. DSP 118 also may use real-time feedback signals 180A-D as the initial setpoints 174A-174D for control loops 125A-125D, respectively. Thus, each control loop 125 may continuously generate and provide instantaneous control inputs 178 based on the real-time operating point of the inverter 156. This makes it possible to for the DSP 118 to transition to a different control mode without an abrupt change in the operating setpoint.

For example, DSP 118 may currently be controlling inverter 156 with Pac control loop 125A. At the same time, DSP 118 continues to use Idc feedback signal 180B to generate proportional and integration terms for PI controller 176B. DSP 118 may send commands 172 switching to the Idc operating mode. Output 178B of PI controller 176B can then be used to control inverter 156, and the real-time Idc feedback signal 180B can be instantaneously used as the new Idc setpoint 174B for control loop 125B. Similar examples can be drawn for transition between the any of the other control modes.

FIG. 4 shows control loops 125 operating in parallel. However, the output from one active PI controller 176 can also be used to calculate the outputs for other inactive PI controllers 176. For example, PI controller 176A may determine PI control terms used in control loops 125B-125D based on the PI control term values determined in control loop 125A. When transitioning to a different control mode, DSP 118 instantaneously knows the outputs of all PI controllers 176 based on a calculated set of outputs and may transition to a new control mode with the associated set of PI control terms. In other words, DSP 118 may deterministically calculate outputs 178 for any of the control modes so all four PI controller code blocks 176 do not need to be operated simultaneously. Although this is not necessary, it saves computational resources within the DSP 118.

Figure 5:
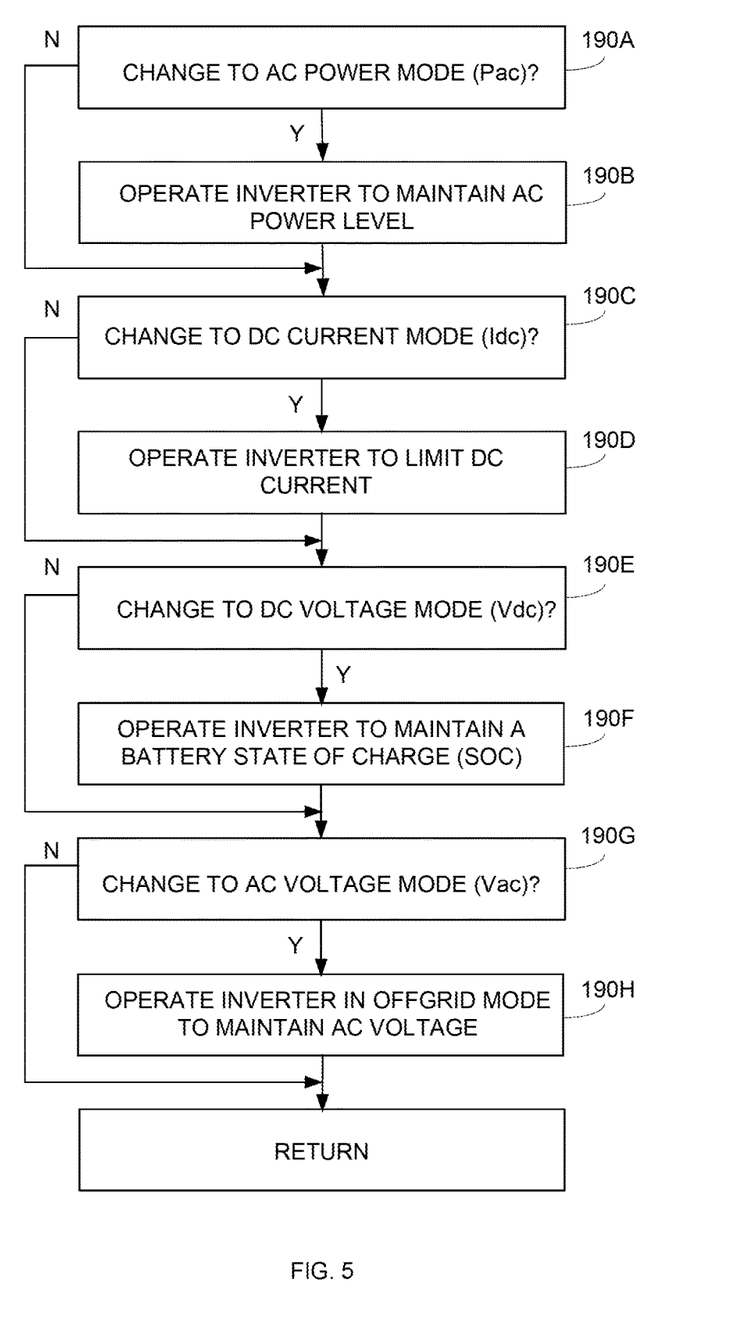
FIG. 5 shows an example process for performing seamless control mode transitions.

FIG. 5 shows an example process for seamless control mode transitions. In operation 190A, DSP 118 may command PCS 60 to operate in the AC power control mode. In operation 190B, DSP 118 activates Pac control loop 125A in FIG. 4 where AC output power is based on Pac setpoint 174A. For example, during normal operation, battery 55 may operate at a nominal 48 VDC and PCS 60 may generate AC output power Pac for transferring power to AC loads connected to electrical panel 62 or power grid 64 based on a 5 kilowatt (kW) power setpoint 174A. In this case, DSP 118 may use AC power mode setpoint 174A to ensure a 5 KW AC output from PCS 60.

In operation 190C, DSP 118 may command PCS 60 to operate in the DC current control mode. In operation 190D, DSP 118 activates Idc control loop 125B in FIG. 4 where Idc 180B is controlled based on Idc setpoint 174B. For example, DSP 118 may detect a battery temperature Tbatt 70 in FIG. 2 that requires restricted DC current use to maintain a battery warranty. In operation 190D, DSP 118 uses Idc setpoint 174B and feedback measurement 180B to control DC current to and from battery 55 in FIG. 2.

In operation 190E, DSP 118 may command PCS 60 to operate in the DC voltage control mode. In operation 190F, DSP 118 activates Vdc control loop 125C in FIG. 4 where Vdc current 180C is controlled based on Vdc setpoint 174C. For example, DSP 118 may detect DC voltage dropping below a threshold value. One threshold voltage may indicate a battery transitioning into a state of deep discharge 162C as previously shown in FIG. 3. For example, PV system 51 in FIG. 1 may not be operating and PCS 60 may need to maintain charge in battery 55 above 1%. For example, a threshold voltage 162 of 40 VDC may correspond to a 1% charge in battery 55.

In operation 190F, DSP 118 may command inverter 156 to charge battery 55 from the power grid until battery 55 reaches a critical threshold setpoint 174C (e.g., 40 VDC). If DC voltage 152 exceeds this threshold, DSP 118 may allow inverter 156 to discharge battery 55 back onto the AC grid 64 until the battery voltage again drops to the critical threshold.

DSP 118 may determine if the DC voltage 152 reaches the previous DC threshold voltage. For example, PV system 51 in FIG. 1 may again become operational and charge battery 55 back to charge state 162A or 162B in FIG. 3. In operation 190A, DSP 118 then may transition back to the AC power mode by activating Pac control loop 125A where Pac setpoint 174A is used for controlling inverter 156.

In operation 190G, DSP 118 may command PCS 60 to operate in the AC voltage off-grid control mode. For example, DSP 118 may detect an outage on power grid 64. In operation 190H, DSP 118 transitions to the off-grid mode by activating Vac control loop 125D in FIG. 4 where AC output voltage from PCS 60 is controlled based on Vac setpoint 174D. DSP 118 then seamlessly transitions into a voltage forming mode where inverter 156 provides Vac on a microgrid independently of AC grid 64.

The operation transitions 190A, 190C, 190E, and 190G may be executed in any order. They may also be triggered by the internal logic of the DSP 118 or commanded externally by an EMS 58 or system operator. The subsequent operating conditions 190B, 190D, 190F, 190H may be different than those indicated in FIG. 5.

Seamless transition from one of the on-grid control modes AC power, DC voltage, or DC current to the off-grid AC voltage control mode enables PCS 60 to power backup loads 66 as an uninterrupted power supply (UPS). When power grid 64 is interrupted, inverter 156 may temporarily operate in a ride-through mode, maintaining connection to the grid for a specific predefined period of time. After switching to off-grid mode 125D, DSP 118 then commands the inverter 156 to form a microgrid wherein the Vac setpoint 174D is the same value as before the grid power interruption. The off-grid control mode is independent from the other control modes and does not necessarily need to be implemented to achieve the on-grid seamless control mode transition functionality.

Inverter 156 may include separate output terminals that connect to power grid 64 and separately connect to critical loads 66. DSP 118 may initially monitor power grid 64 and transition to off-grid mode 125D when a disruption is detected in the AC voltage. DSP 118 activates Vac control loop 125D enabling Vac setpoint 174D. The Vac voltage generated by inverter 156 on the microgrid is then used as feedback 180D.

Figure 6:
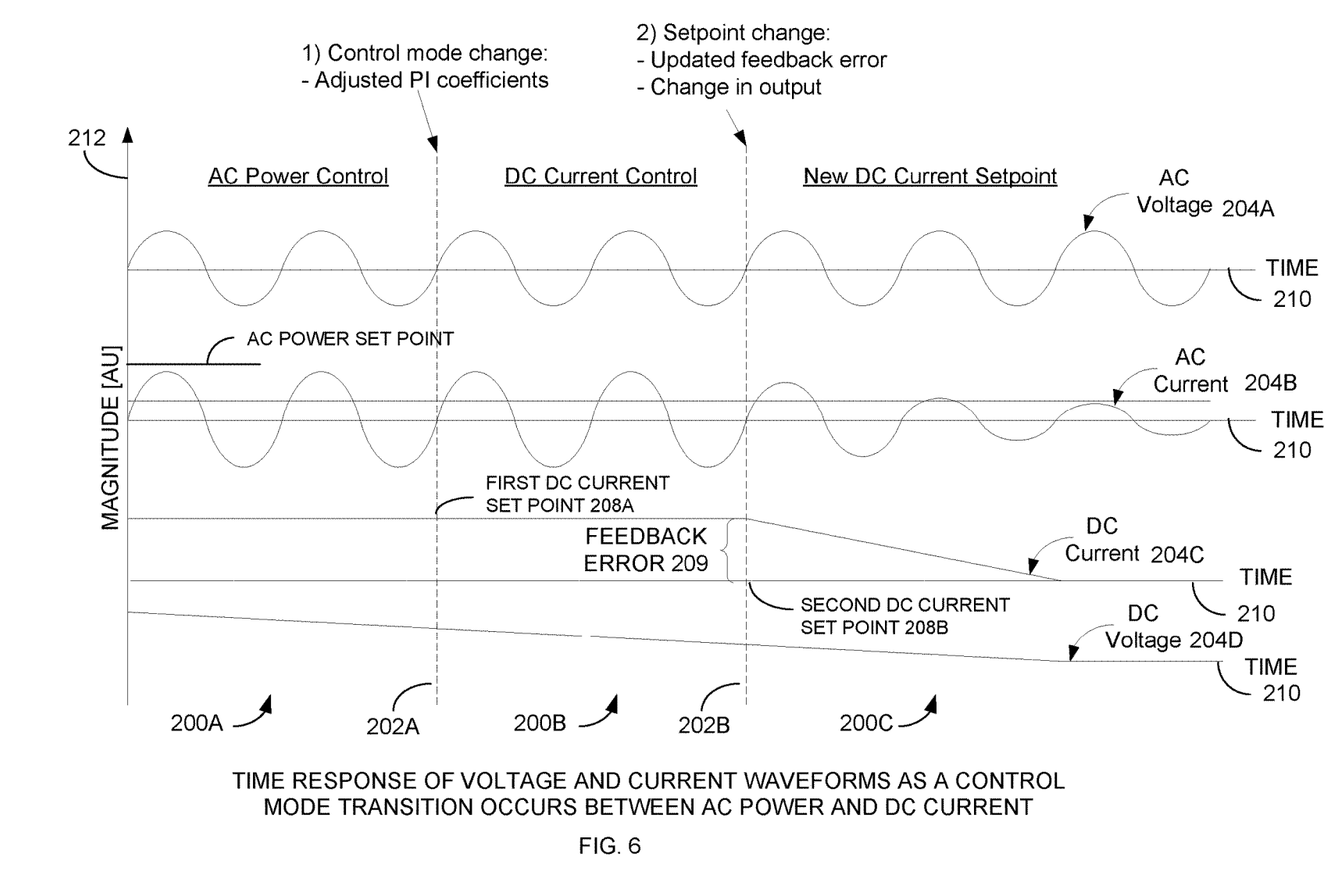
FIG. 6 shows example signal responses resulting from seamless control mode transitions.

FIG. 6 shows typical voltage and current waveforms produced by PCS 60 using the seamless transition operations described above. Waveform 204A represents AC voltage Vac 156 at the AC terminals 158 of PCS 60, waveform 204B represents AC current Iac 154 at the AC terminals 158 of PCS 60, waveform 204C represents DC current Idc 150 at the DC terminals 148 of PCS 60, and waveform 204D represents DC voltage Vdc 152 at the DC terminals 148 of PCS 60. The horizontal x-axis 210 in FIG. 6 represents time and the vertical y-axes 212 in FIG. 6 represent a magnitude of the corresponding waveforms 204 on an arbitrary scale.

A first section 200A of waveforms 204 represent PCS 60 operating in an AC power control mode. In AC power control mode 200A, PCS 60 may use Pac control loop 125A and operate based on a Pac setpoint 174A in FIG. 4. For example, Pac setpoint 174A may be set at 1 KW and AC voltage 204A and AC current 204B may be used as feedback 180A in Pac control loop 125A for generating the 1 KW AC output.

PCS 60 may still monitor DC current 204C and DC voltage 204D while operating in AC power mode 200A, but may not actively control inverter 156 based on either DC current 204C or DC voltage 204D. In this example, DC voltage 204D is linearly decreasing during AC power mode 200A to demonstrate that the battery state of charge is being reduced as shown in FIG. 3.

At time 202A, PCS 60 changes to the DC current control mode 200B. In one example, PCS 60 may change to DC current control mode 200B by using PI control coefficients Kp-Idc and Ki-Idc in PI controller 176B to control inverter 156. PCS 60 also uses a new DC current setpoint 208A that corresponds with the real-time value of DC current 204C at time 202A before the control mode transition.

Even though PCS 60 changes to DC current control mode 200B, the electrical outputs of PCS 60 may not change until the DC current setpoint 208A is changed. For example, PCS 60 may maintain the same electrical output 204A, 204B, and 204C since setpoint 208A and DC current 204C are the same value at time 202B. Since there is no change in DC current setpoint 208A, PCS 60 may continue to generate the same 1 KW AC output power (Vac 204A*Iac 204B) during DC current control mode 200B.

At time 202B, a new DC current setpoint 208B is received. For example, PCS 60 may detect a temperature change that requires the battery to operate at a lower DC current 204C to prevent voiding a battery warranty, or the EMS 58 may issue a lower DC current setpoint for another reason. PCS 60 starts adjusting AC output current 204B after DC current setpoint 208B changes at time 202B. For example, PCS 60 may gradually lower AC current output 204B based on a feedback error E-Idc(t) 177B in FIG. 4 between falling DC current 204C and setpoint 208B during DC current control mode 200C. PCS 60 continues to reduce AC current 204B until DC current 204C reaches setpoint 208B.

This seamless transition scheme may reduce interruptions in power flow when PCS 60 transitions between different control modes. The seamless transition scheme also enables PCS 60 to more precisely and explicitly adjust system parameters in real-time than otherwise possible through a single control mode. For example, a DC voltage control scheme may respond to a SOC battery parameter but might not be directly controllable using an AC output power setpoint.

As mentioned above, PCS 60 may use a first real-time measured value during a first control mode to calculate corresponding setpoints for other control modes. For example, as shown above in FIG. 6, DSP 118 may monitor AC voltage 204A, AC current 204B, DC current 204C, and DC voltage 204D while operating inverter 156 in the AC power control mode 200A. DSP 118 then may use any of the other previously monitored signals 204 as a new setpoint for operating inverter 156 in an associated different one of the operating modes.

In a control mode handoff, PCS 60 instantaneously selects the new setpoint based on the setpoint from the previous control mode. This means that the existing state of battery system 54 may establish the starting point of the next control mode. In one example, transitions may occur at the zero-crossing of the AC voltage waveform 204A to reduce instantaneous power during the transition between different control modes and reduce the corresponding risk of the transition. For example, PCS 60 may change between AC power control mode 200A and DC current control mode 200B at time 202A when the AC voltage 204A is at zero AC volts.

In some control mode change scenarios, close coordination may be desired between PCS 60 and EMS 58 in FIG. 1. For example, a setpoint request issued by EMS 58 may result in a control mode transition in PCS 60. PCS 60 may communicate the control mode transition back to EMS 58. EMS 58 then may update request limits. In this way, DER system 50 in FIG. 1 avoids oscillatory responses in which EMS 58 repeatedly pushes PCS 60 into a control mode in an attempt to recover the magnitude of a parameter.

The four control modes (AC power, DC voltage, DC current, and AC voltage) may have separate sets of coefficients that govern their feedback loop responses. These control parameters all may be controlled by PI controllers 176 implemented in software within DSP 118, but this is not a requirement. For example, a single PI controller 176 may be used where at the instant of control mode transition, new control coefficients may be loaded and immediately used in the feedback loop with the new control parameters.

By using dynamic control mode adjustments, the PCS 60 may recover from undesirable operating states without disconnecting from power grid 64 and restarting battery system 54 and inverter 156. The undesirable operating states may include battery 55 being below a certain SOC or DC current 150 exceeding battery power specifications. In general, the seamless control mode transitions may provide battery storage system 54 and PCS 60 a wider variety of methods by which to respond to requests from EMS 58.

Figure 7:
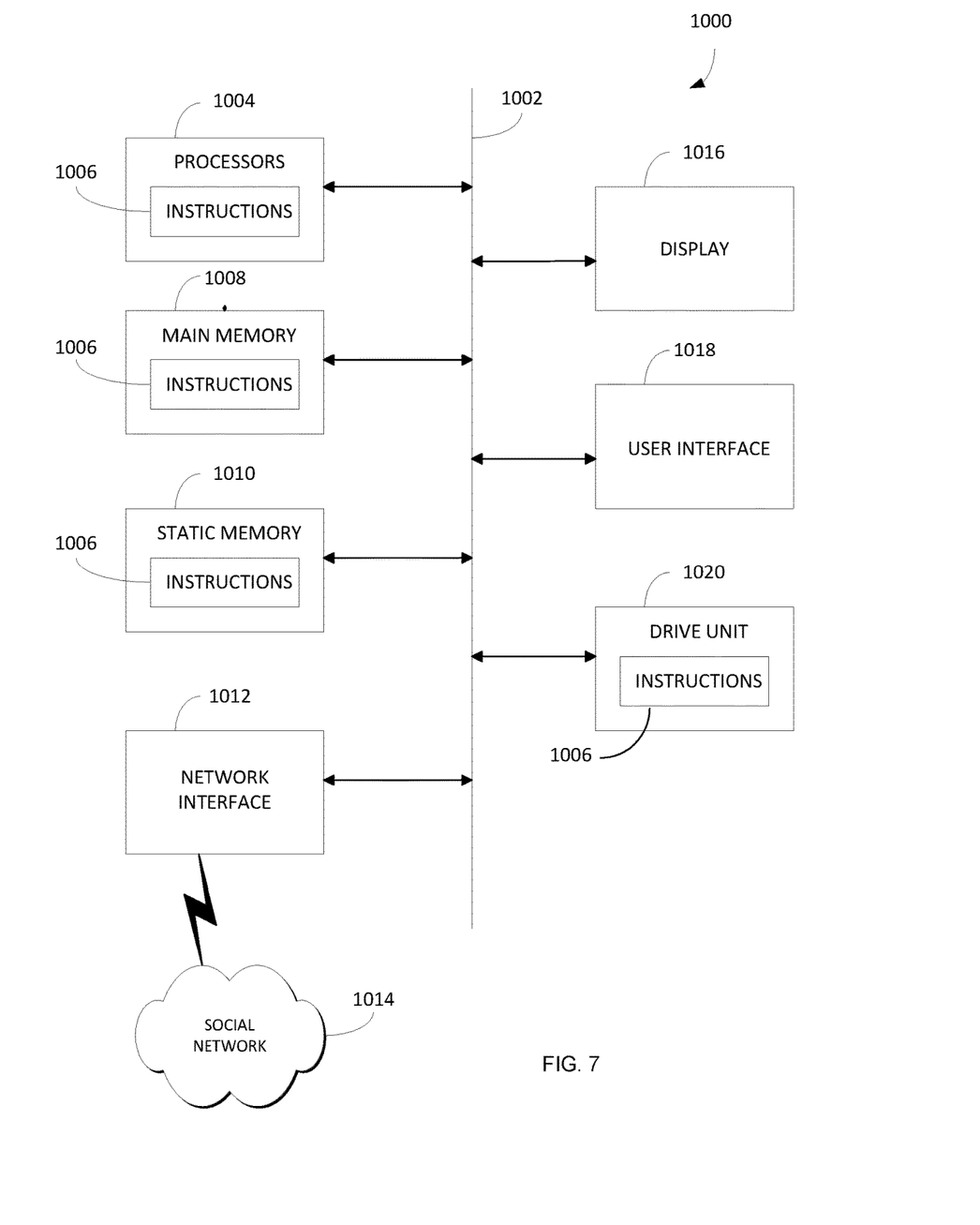
FIG. 7 an example computer system used for performing seamless control mode transitions.

FIG. 7 shows a computing device 1000 that may be used for implementing or operating in combination with DSP 118, PV inverter 56, PCS 60, EMS 58, and any combination of devices and processes for performing the seamless control transitions discussed above. While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

The system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A circuit for transitioning between different control modes, comprising:
   a digital signal processor (DSP) configured to:
   monitor AC power at AC terminals of an inverter;
   monitor a DC voltage at DC terminals of the inverter;
   monitor a DC current at the DC terminals of the inverter;
   operate in a first control mode where a first setpoint for operating the inverter is associated with a first one of the AC power, DC voltage, and DC current; and
   transition to a second control mode where a second setpoint for operating the inverter is associated with second one of the AC power, DC voltage, and DC current.

2. The circuit of claim 1, wherein the DSP is further configured to initially set the second setpoint to a monitored value of the second one of the AC power, DC voltage, and DC current at the transition to the second control mode.

3. The circuit of claim 1, wherein the DSP is further configured to:

generate a first control signal for operating the inverter during the first control mode based on a first feedback error between the first setpoint and the first one of the monitored AC power, DC voltage, and DC current; and generate a second control signal for operating the inverter during the second control mode based on a second feedback error between the second setpoint and second one of the monitored AC power, DC voltage, and DC current.

4. The circuit of claim 3, wherein the DSP is further configured to:

receive a change for the second setpoint;

determine a new second feedback error between the changed second setpoint and the second one of the AC voltage, AC current, DC voltage, and DC current; and change the second control signal for operating the inverter during the second control mode based the new second feedback error.

5. The circuit of claim 1, wherein the DSP is further configured to:

generate a first set of proportional and integral terms used for operating the inverter in the first control mode; and generate a second set of proportional and integral terms used for operating the inverter in the second control mode.

6. The circuit of claim 1, wherein the DSP is further configured to operate in a third control mode where a third setpoint for operating the inverter is associated with an AC voltage generated by the inverter.

7. The circuit of claim 6, wherein the DSP is further configured to transition from one of the first or second control modes to the third control mode based on a power interruption on the AC grid connected to the inverter.

8. A method for operating a power control system, comprising:

monitoring AC power on an AC bus;

monitoring a DC voltage for a battery;

monitoring a DC current for the battery;

operating an inverter in a first control mode based on a first setpoint associated with a first one of the AC power, DC voltage, and DC current;

detecting a condition for transitioning from the first control mode to a second control mode;

setting a second setpoint to a second one of the AC power, DC voltage, and DC current; and transitioning from the first control mode to the second control mode that operates the inverter based on the second setpoint.

9. The method of claim 8, further comprising:

detecting a condition for transitioning from one of the first or second control mode to a third control mode;

setting a third setpoint to a third one of the AC power, DC voltage, and DC current; and transitioning from the first or second control mode to the third control mode by operating the inverter based on the third setpoint set.

10. The method of claim 8, further comprising:

detecting a condition for transitioning from one of the first or second control modes to an off-grid control mode; and transitioning from the first or second control mode to the off-grid mode by operating the inverter based on an AC voltage setpoint generated by the inverter.

11. The method of claim 10, transitioning to the off-grid mode based on a power interruption on the AC bus connected to the inverter.

12. The method of claim 8, further comprising:

generating a first control signal for operating the inverter during the first control mode based on a first feedback error between the first setpoint and the first one of the monitored AC power, DC voltage, and DC current; and generating a second control signal for operating the inverter during the second control mode based on a second feedback error between the second setpoint and second one of the monitored AC power, DC voltage, and DC current.

13. The method of claim 12, further comprising:

changing the second setpoint;

calculating a new second feedback error between the changed second setpoint and the second one of the monitored AC voltage, AC current, DC voltage, and DC current; and changing the second control signal for operating the inverter during the second control mode based the new second feedback error.

14. The method of claim 8, further comprising:

generating a first set of proportional and integral terms for operating the inverter in the first control mode; and generating a second set of proportional and integral terms for operating the inverter in the second control mode.

15. A power conversion system, comprising:

an inverter for converting between DC power and AC power;

a processor configured to:

operate a first control loop for controlling the inverter based on an AC power setpoint, DC current setpoint, or DC voltage setpoint during a first operating mode;

detect a condition for transitioning to a second operating mode;

use a monitored AC or DC value as a second setpoint; and operate a second control loop for controlling the inverter based on the second set point during the second operating mode.

16. The power conversion system of claim 15, wherein the monitored DC value is a DC current or a DC voltage.

17. The power conversion system of claim 15, wherein the processor is further configured to:

detect a condition for transitioning from the first or second operating mode to a third off-grid mode;

use an AC voltage generated by the inverter as a third setpoint; and operate a third control loop for controlling the inverter based on the third setpoint during the third off-grid mode.

* * * * *